United States Patent [19]

Ying et al.

[11] 4,237,392

[45] Dec. 2, 1980

[54] ROTOR MEMBER FOR A SUPERCONDUCTING GENERATOR

[75] Inventors: Sui-chun Ying, Monroeville, Pa.; Joseph L. Smith, Jr., Concord, Mass.; Kai J. Baumann, Pittsburgh, Pa.

[73] Assignee: Westinghouse Electric Corp., Pittsburgh, Pa.

[21] Appl. No.: 936,421

[22] Filed: Aug. 24, 1978

[51] Int. Cl.³ .............................................. H02K 9/00
[52] U.S. Cl. ..................................... 310/52; 310/261; 403/220
[58] Field of Search ................. 310/10, 52, 40, 54, 310/64, 261; 336/DIG. 1; 403/220; 64/13

[56] References Cited

U.S. PATENT DOCUMENTS

| | | | |
|---|---|---|---|
| 3,985,000 | 10/1976 | Hartz | 403/220 |
| 4,060,742 | 11/1977 | Litz | 310/52 |
| 4,092,555 | 5/1978 | Ying | 310/52 |
| 4,117,357 | 9/1978 | Baumann | 310/261 |
| 4,123,676 | 10/1978 | Cooper | 310/52 |
| 4,152,609 | 5/1979 | Cooper | 310/52 |

Primary Examiner—R. Skudy
Attorney, Agent, or Firm—G. H. Telfer

[57] ABSTRACT

A rotor is provided for an alternating current generator having a superconducting field winding. The rotor consists of a cylindrical outer member and a cylindrical inner member disposed coaxially inside the outer member. The inner rotor member carries a superconducting field winding and is cooled to maintain the winding temperature at superconducting temperatures during operation. The inner rotor member is rigidly attached at one end to the outer member and at the other end, which is the drive end, a connection is provided between the inner and outer members which has sufficient axial flexibility to allow large differential thermal expansion and contraction of the inner member, and which has sufficient torsional stiffness to transmit driving torque between the members. The flexible connection is preferably a laminated structure made up of thin slotted laminations having elements extending radially between the two rotor members and a driving connection to the inner member.

6 Claims, 4 Drawing Figures

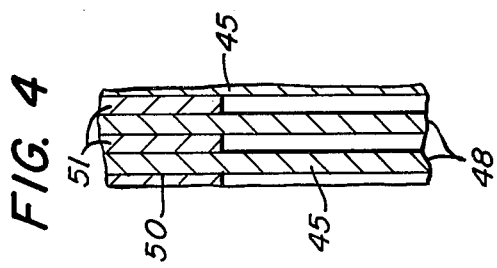
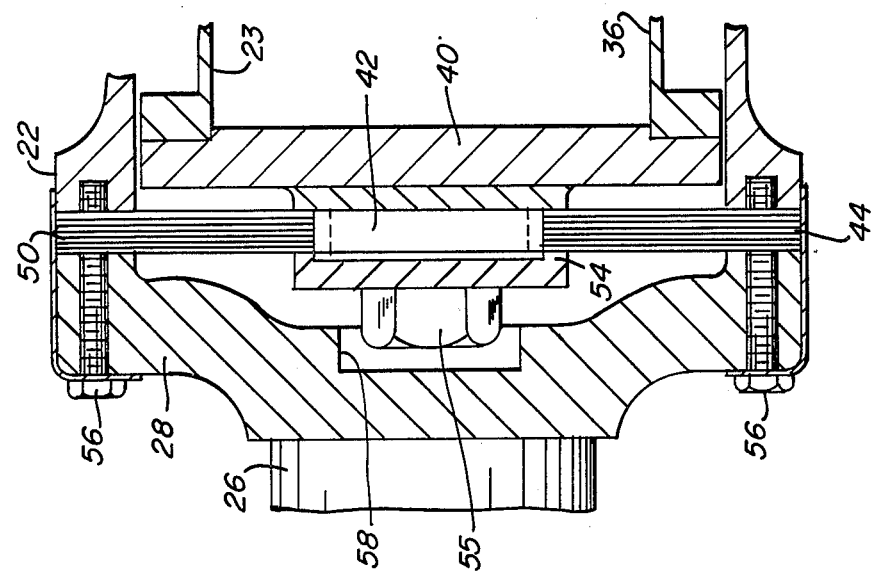
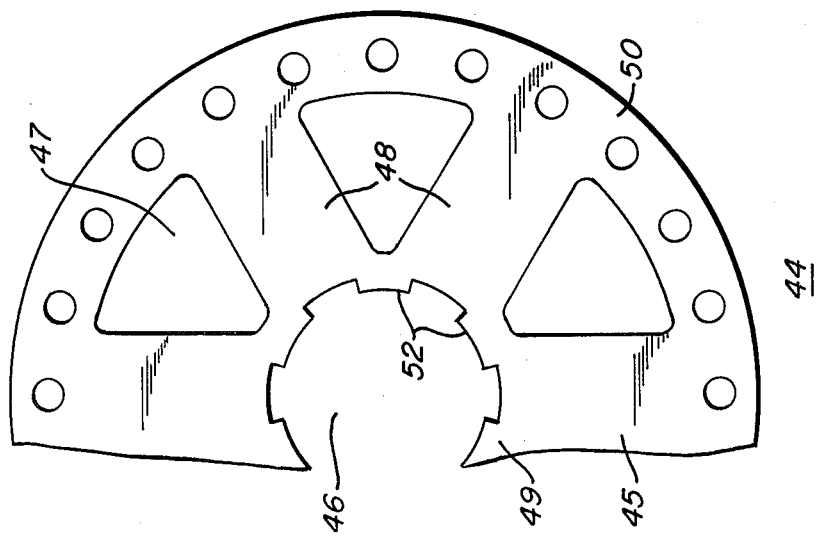

ROTOR MEMBER FOR A SUPERCONDUCTING GENERATOR

BACKGROUND OF THE INVENTION

The present invention relates to superconducting generators, and more particularly to a rotor structure for a generator having a superconducting field winding.

Large alternating current generators with superconducting field windings offer great potential benefits. Such machines operate with no losses in the field winding itself and thus can provide higher magnetic fields than conventional generators and with greater efficiency. This allows the generation of more power per unit volume of the generator and thus makes it possible to achieve greatly increased ratings or to reduce substantially the size and cost of a machine of given rating. The reduction in electrical losses during operation of the machine is also an important advantage and represents a very substantial saving in operating cost.

Such machines have rotating field members consisting of a cylindrical rotor carrying the superconducting field winding. The winding conductors are made of a superconducting material and means are provided for circulating a cryogenic coolant fluid during operation of the machine to maintain the windings in the superconducting state, that is, at a temperature below the critical temperature of the material. An external refrigeration system is provided for this purpose to supply liquid helium to the winding during operation, the helium exhausting in the gaseous state for return to the refrigerator.

Such a rotor preferably has a relatively massive cylindrical outer rotor member which operates essentially at ambient temperature, and a separate inner rotor member carrying the field winding itself and operating at cryogenic temperatures. The rotor is preferably evacuated to minimize heat flow to the superconducting winding and may be provided with radiation shields to further reduce heat transfer. The inner rotor member is supported on the outer rotor member and the inner and outer members must be connected together in a manner to enable the transmission of torque during operation of the machine. The inner rotor member carrying the field winding operates at superconducting temperature, however, while the outer member is essentially at ambient temperature, so that there is an extremely large temperature difference between the two members during operation. A large differential thermal contraction of the inner member relative to the outer member, therefore, occurs during the initial cool-down of the rotor at the beginning of operation, and a corresponding expansion occurs after shutdown when the rotor is allowed to return to room temperature. It is necessary, therefore, not only to provide for the transmission of torque but to allow this large differential thermal contraction to take place without introducing serious stresses or distortions in the structure.

It has been proposed heretofore, as disclosed in a copending application of G. D. Cooper et al, Ser. No. 734,943, filed Oct. 22, 1976, now U.S. Pat. No. 4,123,676 and assigned to the Assignee of this invention, to provide for relative sliding movement between inner and outer rotor members to allow for thermal contraction. For this purpose, cylindrical engaging surfaces are provided on the inner and outer members at one end of the rotor and a driving connection is made only at the other end. The inner and outer members are thus free to slide on each other to permit the differential contraction and expansion. Such a support, however, requires very accurate control of the friction between the engaging surfaces to permit sliding when necessary while providing proper support during normal operation. This requires careful design and manufacture, and extensive testing. Furthermore, such a support is preferably located outside the vacuum enclosure of the inner rotor member so that a vacuum seal of bellows type is required to accommodate the large differential expansion, which is undesirable.

SUMMARY OF THE INVENTION

The present invention provides a rotor structure carrying superconducting field windings on an inner rotor member with an axially flexible driving connection between the inner member and an outer rotor member to permit differential thermal expansion and contraction.

In accordance with the invention, a rotor for a superconducting generator has a relatively massive cylindrical outer rotor member which may carry damper and shielding means and which is capable of withstanding the mechanical forces that may occur under short-circuit or fault conditions as well as of transmitting the normal driving torque. The superconducting field winding is carried on a cylindrical rotor member which is mounted coaxially inside the outer member and attached rigidly to it at the end opposite the drive end. Suitable refrigeration means are provided to maintain the winding at superconducting temperatures during operation. At the drive end of the rotor, the inner rotor member is connected to the outer member by a flexible connection which has sufficient axial flexibility to allow the large differential thermal expansion and contraction discussed above, and which has sufficient torsional stiffness to transmit driving torque between the inner and outer rotor members.

The flexible connection preferably consists of a circular laminated structure comprising a pack of thin steel laminations. The laminated structure is rigidly clamped at its outer periphery to the outer rotor member and engages the inner rotor member with a driving connection, preferably a splined connection, between a central opening of the connection means and a driving portion or extension of the inner rotor member. In order to obtain the desired axial flexibility, the laminations are preferably slotted by having openings punched in them which form radial spokes connecting the inner and outer peripheral portions of the laminations. In this way, the desired axial flexibility is obtained to permit relatively large axial movement of the inner rotor member relative to the outer member, while the connecting means is sufficiently stiff in the torsional direction to be capable of transmitting the driving torque to the inner rotor. A rotor structure is thus provided which can be designed to accommodate the extreme differential thermal contraction without excessive stress, and which is simple and practical to manufacture and requires no special vacuum seals.

BRIEF DESCRIPTION OF THE DRAWINGS

The invention will be more fully understood from the following detailed description, taken in connection with the accompanying drawings, in which:

FIG. 2 is an enlarged longitudinal, sectional view of the drive end of the rotor of FIG. 1;

FIG. 3 is an end view of a flexible connecting means; and

FIG. 4 is an enlarged fragmentary transverse sectional view of the peripheral portion of the connecting means.

DESCRIPTION OF THE PREFERRED EMBODIMENT

Figure 1:
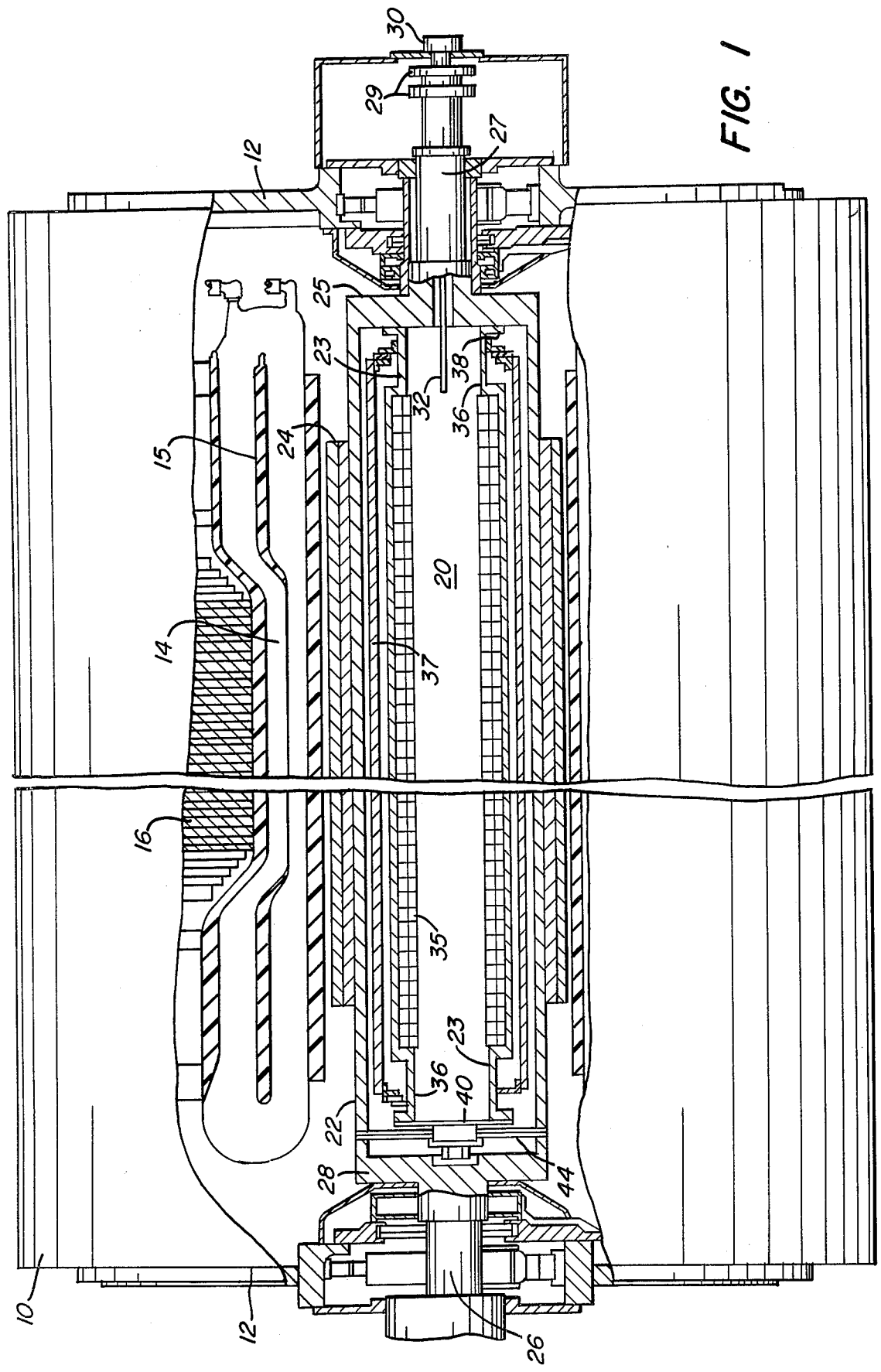
FIG. 1 is a view, in elevation, of a generator having a rotor embodying the invention, part of the housing being broken away.

The invention is shown in the drawings embodied in a rotor for a large superconducting alternating current machine such as a turbine generator or large motor. The stator and housing of the machine may be of any suitable or desired construction. As shown in FIG. 1, the machine has a gas-tight housing 10 closed at the end by bearing brackets 12. The stator member includes an armature winding 14 of any suitable type, shown as an airgap winding of cylindrical configuration embedded in a monolithic insulating body 15. The armature winding 14 is supported in a laminated magnetic shield 16 surrounding the winding and suitably supported in the housing 10. The construction of the stator member may be of any suitable type and has not been shown in detail as it is not a part of the present invention. The housing 10 is filled with a coolant gas which is preferably helium because it is non-inflammable and a supply of helium is required in any event for cooling the rotor. The armature winding 14 and the magnetic shield 16 may additionally be water cooled, if desired.

The rotor 20 consists of a generally cylindrical hollow outer rotor member 22 and a hollow cylindrical inner rotor member 23 disposed inside the outer member 22 and mounted coaxially thereof. The outer rotor member 22 is a relatively massive steel cylinder intended to support and protect the inner rotor member, and carries a combined shield and damper 24 on its outer surface. The damper-shield 24 may be a composite member, as shown, having high electrical conductivity and good mechanical strength so as to be capable of serving as a damper and also as a shield to protect the rotor from magnetic fields in the airgap. The outer rotor member 22 has sufficient strength to withstand the high mechanical forces which can occur under short-circuit or fault conditions, so that the inner rotor member 23 is protected against external forces. The outer rotor member 22 may be closed at one end, as indicated at 25, and has shaft portions 26 and 27 at its opposite ends supported in suitable bearings in the brackets 12. The shaft portion 26 is a driving shaft adapted to be coupled to a turbine, or other prime mover, to transmit torque to the rotor 20 and has a radially-extending flange 28 adapted to be clamped to the outer rotor member 22.

The shaft portion 27 at the opposite or non-driving end is not required to transmit any substantial torque and may be of smaller diameter than the shaft 26. The shaft portion 27 carries collector rings 29 at its outer extremity for supplying excitation current to the field winding through suitable leads from an external exciter of any suitable type. Shaft portion 27 is made hollow for entrance and discharge of the cryogenic coolant fluid for the superconducting field winding. Any suitable type of cooling system may be utilized in which liquid helium is supplied from an external refrigeration system. The liquid helium may be introduced into the rotor through a port assembly 30 to a passage 32 which extends on the axis of the rotor and connects to suitable ducts or passages (not shown) to cool the winding. The helium may be discharged as a gas through the shaft 27.

The inner rotor member 23 carries the superconducting field winding 35. The inner rotor 23 is a hollow cylindrical member adapted to carry and protect the winding 35. In the preferred arrangement shown, the winding 35 is placed in slots in the inner surface of the cylindrical rotor 23 so that it is protected and supported by the rotor. The winding 35 may be made of any suitable superconducting material, such as multifilamentary conductors of niobium-titanium alloy in a copper or copper-nickel matrix. Such conductors are known and available but any suitable superconducting material could be utilized. The winding 35 may be arranged in slots in the rotor 23 in any suitable or desired configuration to form a field winding for the machine. During operation, the winding 35 is cooled to superconducting temperature by means of the helium, or other cryogenic coolant, supplied through the passage 32.

The cylindrical inner rotor member 23 terminates at each end in torque tube portions 36, each having a wall thickness which is adequate to transmit the required torque but thin enough and long enough to minimize heat flow into the cryogenic portion of the rotor. A radiation shield 37 is provided encircling the inner rotor member 23 and mounted thereon by suitable mountings to protect the rotor from radiated heat. The interiors of the rotor members 23 and 24 are evacuated, and additional radiation shielding or vacuum enclosures may be provided as necessary or desired. At the non-driving end, which is the right-hand end in FIG. 1, the inner rotor member is rigidly attached to the outer rotor by means of a flange 38 which may be bolted, keyed or otherwise rigidly attached to the end 25 of the outer rotor. At the drive end of the rotor, as more clearly shown in FIG. 2, the inner rotor member 23 is closed by an end plate 40 which has a driving extension or stub shaft 42 extending therefrom through which the inner rotor member is driven from the outer rotor member.

During operation of the machine, the superconducting field winding 35 is cooled to the very low temperature at which it becomes superconducting while the outer rotor member 22 operates essentially at ambient temperature. Thus, therer is an extremely high temperature difference between the inner and outer rotor members, and during the initial cool-down when the machine is started up and the inner rotor member is brought down to cryogenic temperature, a very large differential thermal contraction occurs which, for example, can be as great as from one-half inch to one inch, depending on the size of the machine. Upon shutdown of the machine, when the inner rotor member is allowed to return to room temperature, a corresponding thermal expansion occurs. This very large relative movement between the inner and outer rotor member must be accommodated in the design of the machine and for this purpose, in accordance with the present invention, there is provided an axially flexible driving connection means 44 between the inner and outer rotor members.

The connection means 44, as shown in FIGS. 2 and 3, comprises a laminated circular structure having sufficient axial flexibility to accommodate the differential expansion and contraction between the inner and outer rotor members. The connection 44 preferably consists of a plurality of thin circular steel laminations 45 having the same diameter as the outer rotor member 22 and having a central opening 46 adapted to receive the driving extension 42 of the inner rotor member. The laminations 45 have generally radial slots 47 forming radial spokes 48 between them connecting a central hub portion 49 and the outer peripheral portion 50. The spokes 48 have substantial flexibility transversely to the plane of the laminations, that is, axially of the machine, but are relatively stiff in the circumferential or torsional direction so as to be capable of transmitting torque. The laminations 45 are assembled in a pack, as shown in FIG. 2, and adjacent laminations are preferably separated by thin shims or spacers 51, as shown in FIG. 4, inserted between the laminations at the inner and outer peripheries of the pack. The laminations and spacers are preferably brazed together to form a solid outer rim portion 50 and central hub portion 49 joined by the radial spokes 48 which are spaced apart axially sufficiently to prevent fretting and corrosion between the laminations.

The driving extension 42 of the inner rotor member 23 is received in the central opening 46 of the hub portion 49, and interengaging splines 52 are provided in the hub portion 49 and on the extension 42 so that a driving connection is provided between these two members. A clamp 54 and bolt 55 are provided to hold the laminated connection 44 in place on the driving extension 42. The outer rim or periphery 50 of the connecting means 44 is solidly clamped to the outer rotor member 22. Thus, the connector 44 may be clamped, as by bolts 56, between the flange 28 of the driving shaft 26 and the end surface of the outer rotor member 22. The connection means 44 thus forms a driving connection which is rigidly clamped to the outer rotor member to be driven by the shaft 26, and which has a driving connection with the extension 42 of the inner rotor member. The structure is such that the connector 44 is quite stiff, or substantially rigid, torsionally so as to be capable of transmitting the required torque from the outer to the inner rotor member. Because of the laminated construction and the slotted arrangement described, however, the connection means 44 has substantial axial flexibility and can deflect in the axial direction a sufficient distance to accommodate the differential thermal expansion and contraction between the inner and outer rotor members. Sufficient clearance for this movement is provided by a recess 58 in the inside of flange 28.

A driving connection has thus been provided for joining the inner rotor to the outer rotor of a superconducting generator in a manner which provides for transmission of torque and which also accommodates the very large differential thermal contraction which occurs between the two members. In such expansion or contraction of the inner rotor member, the connection 44 is subjected to both tensile and bending stresses. These stresses, as well as those due to other loads, can readily be calculated, however, and it can be shown that for a machine of reasonable size, the total stress is within the permissible limits for steel laminations. The stress is proportional to the modulus of elasticity, however, and for larger machines where the stresses become quite high, materials of lower modulus such as titanium may be used for the laminations 45 to keep the stress within allowable limits.

The flexible driving connection disclosed herein provides for the very large differential contraction and expansion of the inner rotor member without the problems involved in providing proper frictional contact for a sliding connection, such as has been previously proposed, and does this in a manner which provides positive driving connection to the inner rotor member and with sufficient axial flexibility to permit the required movement without excessive stresses. It will also be noted that the driving connection is enclosed within the evacuated interior of the rotor, and no special vacuum seals are required as the joints between the connecting means 44 and the outer rotor member and driving flange can readily be made vacuum-tight, as by means of gaskets. The requirement for bellows-type vacuum seals is, therefore, avoided.

What is claimed is:

1. A rotor structure for a dynamoelectric machine comprising: a hollow cylindrical outer rotor member; shaft portions at opposite ends of said rotor member, one of said shaft portions being a drive shaft; a cylindrical inner rotor member disposed coaxially within the outer rotor member, said rotor member carrying a winding of superconducting material and including means for maintaining the winding at superconducting temperatures; means for rigidly attaching the inner rotor member to the outer rotor member at the end opposite said drive shaft; and connecting means for connecting the inner rotor member to the outer rotor member at the drive end, said connecting means comprising a radially-extending flexure member secured to the outer member and engaging the inner rotor member with a drive connection, said flexure member being a laminated circular structure having its outer periphery secured to the outer rotor member and having a central opening for receiving a portion of the inner rotor member, said connecting means being flexible in the axial direction to permit relative axial movement between the inner and outer rotor members and being torsionally stiff to transmit torque.

2. A rotor structure as defined in claim 1 in which said circular structure is built up of a plurality of circular laminations having slots extending therethrough to form radial spokes between the slots.

3. A rotor structure as defined in claim 2 in which the laminated structure has a circular outer periphery joining the spokes and has an inner hub portion joining the spokes and having a central opening for receiving a portion of the inner rotor member.

4. A rotor structure as defined in claim 3 in which said central opening and said portion of the inner rotor member have interengaging splines forming a driving connection.

5. A rotor structure as defined in claim 2 in which said laminations are held together in a pack with means for spacing adjacent laminations apart.

6. A rotor structure as defined in claim 2 in which said laminated circular structure has spacers interposed between adjacent laminations at the inner and outer peripheral portions thereof and joined to the laminations to hold them in a pack, and means for clamping the outer peripheral portion of said pack to the outer rotor member.

* * * * *